US010386470B2

(12) United States Patent
Zivkovic

(10) Patent No.: US 10,386,470 B2
(45) Date of Patent: Aug. 20, 2019

(54) RADAR SYSTEM

(71) Applicant: NXP B.V., Eindhoven (NL)

(72) Inventor: Zoran Zivkovic, Eindhoven (NL)

(73) Assignee: NXP B.V., Eindhoven (NL)

(*) Notice: Subject to any disclaimer, the term of this patent is extended or adjusted under 35 U.S.C. 154(b) by 235 days.

(21) Appl. No.: 15/439,003

(22) Filed: Feb. 22, 2017

(65) Prior Publication Data

US 2017/0248692 A1 Aug. 31, 2017

(30) Foreign Application Priority Data

Feb. 29, 2016 (EP) .................................... 16157898

(51) Int. Cl.
*G01S 13/42* (2006.01)
*G01S 7/35* (2006.01)
*G01S 13/93* (2006.01)
*G01S 13/34* (2006.01)

(52) U.S. Cl.
CPC .............. *G01S 13/42* (2013.01); *G01S 7/352* (2013.01); *G01S 13/343* (2013.01); *G01S 13/931* (2013.01)

(58) Field of Classification Search
CPC ...... G01S 13/343; G01S 13/42; G01S 13/931; G01S 7/352
USPC ........................................................... 342/70
See application file for complete search history.

(56) References Cited

U.S. PATENT DOCUMENTS 5,140,307 A * 8/1992 Rebetez .................... G04F 8/08 340/323 R
7,151,478 B1 12/2006 Adams et al.
9,541,638 B2 1/2017 Jansen et al.
2004/0204113 A1* 10/2004 Kisigami ............... H04B 7/086 455/562.1
2007/0152871 A1 7/2007 Puglia
2009/0222226 A1 9/2009 Baraniuk et al.
2010/0091688 A1 4/2010 Staszewski et al.
(Continued)

FOREIGN PATENT DOCUMENTS

NL 1011782 C1 10/2000
WO 2012/056357 A1 5/2012

OTHER PUBLICATIONS

Guetlein, J. et al. "Switching scheme for a FMCW-MIMO radar on a moving platform", 9th European Radar Conference, pp. 91-94 (2012).

(Continued)

*Primary Examiner* — Timothy X Pham
(74) *Attorney, Agent, or Firm* — Rajeev Madnawat

(57) ABSTRACT

A radar system for a motor vehicle is describe including a plurality (M) of transmitters for transmitting a radar signal, a receiver for receiving the transmitted radar signal reflected by an object, a signal re-constructor coupled to the receiver. Each transmitter is configured to transmit at least part of a frequency modulated continuous wave signal during a time period T having N sample time periods of duration T/N, and in each of the N sample time periods combinations of at least some of the transmitters transmit. The signal re-constructor is configured to determine the coordinates of an object with respect to the radar system from N measurements of the received frequency modulated continuous wave signal, each of the N measurements being made for a time period of T/N. The radar system may reduce the detection time for objects while maintaining the angular resolution.

15 Claims, 9 Drawing Sheets

(56) References Cited

U.S. PATENT DOCUMENTS

| | | | | |
|---|---|---|---|---|
| 2012/0146844 | A1 | 6/2012 | Stirling-Gallacher | |
| 2013/0093613 | A1 | 4/2013 | Itoh et al. | |
| 2013/0169471 | A1 | 7/2013 | Lynch | |
| 2014/0240163 | A1 | 8/2014 | Boufounos | |
| 2014/0247181 | A1 | 9/2014 | Nogueira-Nine | |
| 2014/0355385 | A1* | 12/2014 | Inagaki | G01S 15/02 367/99 |
| 2015/0042503 | A1 | 2/2015 | Morelande et al. | |
| 2015/0055688 | A1 | 2/2015 | Xiong | |
| 2015/0061922 | A1* | 3/2015 | Kishigami | G01S 7/2813 342/147 |
| 2015/0323660 | A1* | 11/2015 | Hampikian | G01S 13/58 342/109 |
| 2016/0003939 | A1 | 1/2016 | Stainvas et al. | |
| 2016/0050055 | A1* | 2/2016 | Mir Ghaderi | H04W 24/02 370/329 |
| 2016/0349353 | A1 | 12/2016 | Wang et al. | |
| 2017/0248686 | A1 | 8/2017 | Zivkovic et al. | |

OTHER PUBLICATIONS

Feger, R. et al. "A frequency-division MIMO FMCW radar system using delta-sigma-based transmitters", IEEE International Microwave Symposium, pp. 1-4 (2014).

Non-Final Rejection for U.S. Appl. No. 15/437,585, 16 pgs. (dated Jun. 19, 2019).

* cited by examiner

300

400

RADAR SYSTEM

CROSS-REFERENCE TO RELATED APPLICATIONS

This application claims the priority under 35 U.S.C. § 119 of European Patent application no. 16157898.4, filed on Feb. 29, 2016, the contents of which are incorporated by reference herein.

FIELD

This disclosure relates to a radar system for a vehicle.

BACKGROUND

In a radar system, multiple transmit antennas may be used to increase radar angular resolution. Properly placed transmit antennas create a similar effect as having more receive antennas by creating so called "virtual antennas". Those systems are usually denoted as Multiple Input Multiple Output (MIMO) systems. The antennas are operated in sequence during transmission and the receiver processes the sequential transmission to determine the range and angle of arrival of a reflected signal. MIMO radar systems may be used for example in cars or other motor vehicle as part of an adaptive driver assistance system. Such a car radar system may typically be a frequency-modulated continuous-wave (FMCW) radar system which uses a linear frequency modulated sweep signal in transmission. The transmitted signal is typically mixed with the received reflected signal which results in a beat frequency. The beat frequency indicates the distance between the radar system and an object.

SUMMARY

Various aspects are defined in the accompanying claims. In a first aspect there is defined a radar system for a motor vehicle comprising a plurality of transmitters for transmitting a radar signal comprising a continuous wave signal, a receiver for receiving the transmitted radar signal reflected by an object, a signal re-constructor coupled to the receiver, wherein each transmitter is configured to transmit at least part of the continuous wave signal during a time period and wherein for each of a number of sample time periods during the time period combinations of at least some of the transmitters transmit, and the signal re-constructor is configured to determine the coordinates of an object with respect to the radar system from a number of measurements of the received continuous wave signal equal to the number of sample time periods.

In one or more embodiments, the radar system may comprise a signal generator coupled to the plurality of transmitters, the signal generator being configured to generate a continuous wave signal comprising a frequency modulated continuous wave chirp signal which repeats after the time period.

In one or more embodiments, the radar system may further comprise a controller coupled to each of the transmitters wherein the transmit controller is operable to route the continuous wave signal to at least one of the transmitters during each of the sample time periods In one or more embodiments, of the radar system the transmit controller may control the sequence of combinations of transmitters used to transmit during the time period T in at least one of a pseudo-random sequence or Gold-code sequence.

By using a pseudo random sequence or Gold-code sequence the combined transmit signal may be generated as a spread spectrum signal.

In embodiments the received radar signal is processed by the signal re-constructor as a sparse signal.

In one or more embodiments, the signal re-constructor may be configured to generate an estimate of the expected signal value of the received signal for each of a plurality of distances between an object and the radar system and an angle of arrival of the received signal and to compare the measured signal value with the expected signal value for each combination of the distances and angles of arrival.

In one or more embodiments the signal re-constructor may be configured to determine the most likely location of an object by determining a minimum difference between the expected value and the received signal value for each combination of the distance and angle of arrival.

In one or more embodiments the radar system may include an antenna switch module coupled to the controller wherein the controller is operable to couple an antenna to the receiver when not in use by a transmitter.

Embodiments of the radar system may be incorporated into an automatic driver assistance system.

Embodiments of the radar system may be formed as an integrated circuit.

In a second aspect there is described, a method of determining the coordinates of an object in a radar system comprising a plurality of transmitters and a receiver, the method comprising transmitting at least part of a continuous wave signal during a time period by varying the combinations of the transmitters used to transmit the signal a number of sample times during the time period, receiving the transmitted frequency modulated continuous wave signal reflected from an object, and determining a distance and angle of the object with respect to the radar system from a number of measurements equal to the number of sample times.

In one or more embodiments the continuous wave signal comprises a frequency modulated continuous wave chirp signal having a duration equal to or less than the time period.

In one or more embodiments determining the distance and angle of the object further comprises summing values of the received signal strength for each element of a matrix, each matrix element representing a signal strength value for a particular angle of arrival value and range value.

In one or more embodiments determining the distance and angle of the object comprises assuming that the majority of elements in the matrix are zero.

In one or more embodiments wherein determining the distance and angle of an object further comprises generating an estimate of the expected signal value of the received signal reflected from an object over a combination of a range of distances and angles of arrival and comparing the measured signal value with the expected signal value for each combination of the distance and angles of arrival.

In a third aspect there is described a computer program product comprising instructions which, when being executed by a processing unit, cause said processing unit to perform a method of determining the coordinates of an object in a radar system comprising a plurality of transmitters and a receiver, the method comprising transmitting at least part of a frequency modulated continuous wave signal during a time period by varying the combinations of the transmitters used to transmit the signal a number of sample times during the time period, receiving the transmitted frequency modulated continuous wave signal reflected from an object, and determining a distance and angle of the object with respect to the radar system from a number of measurements equal to the number of sample times.

In the figures and description like reference numerals refer to like features. Embodiments of the invention are now described in detail, by way of example only, illustrated by the accompanying drawings in which:

FIG. 1 describes a radar system for a motor vehicle according to an embodiment.

FIGS. 2A-2D illustrate a) an example chirp signal characteristic b) a periodic chirp signal characteristic c) a radar system with respect to an object to be detected and a matrix of range and angle of arrival, and d) an example transmit combination and receiver sampling timeline.

FIG. 3 describes a radar system according to an embodiment.

DESCRIPTION

Figure 1:
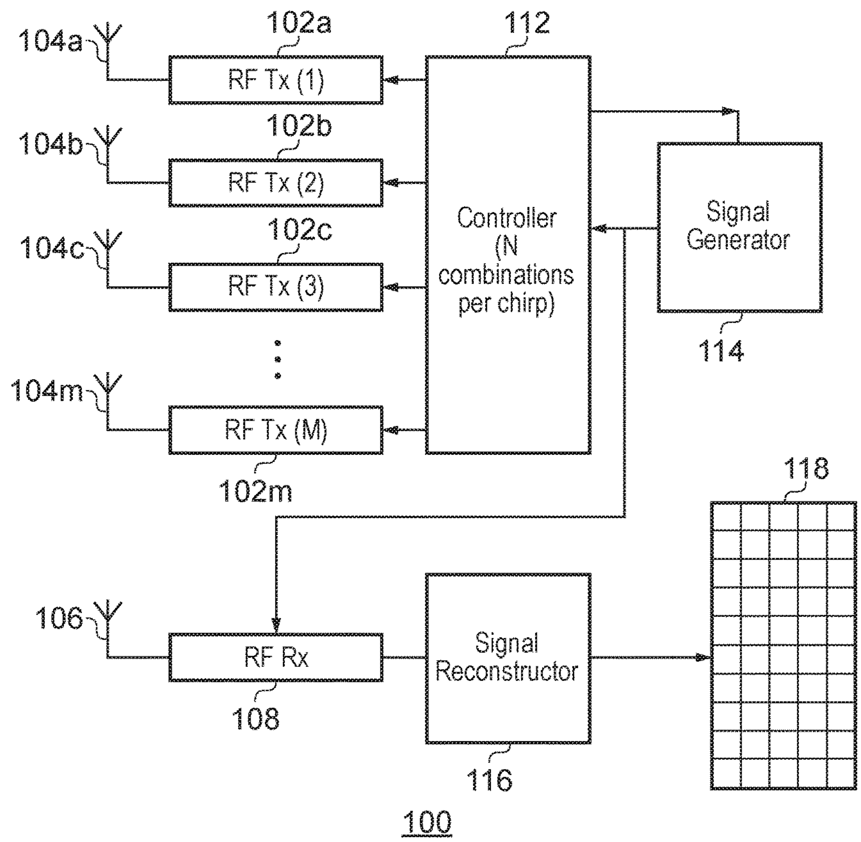

FIG. 1 describes a radar system 100 according to an embodiment. Radar system 100 includes a number M of radio frequency (RF) transmitters 102*a*, 102*b*, 102*c*, 102*m* connected to corresponding antenna 104*a*, 104*b*, 104*c*, 104*m*. A controller 112 has a control output connected to each of the respective RF transmitters 102*a* to 102*m* and a further control output connected to a signal generator 114. The signal generator 114 has an output connected to the controller. The radar system 100 has a receiver chain consisting of an antenna 106 connected to a RF receiver 108. The output of the RF receiver is connected to a signal re-constructor 116. An output of the signal re-constructor 116 is connected to a memory 118. An output of the signal generator 114 is connected to the RF receiver 108.

Figure 2A:
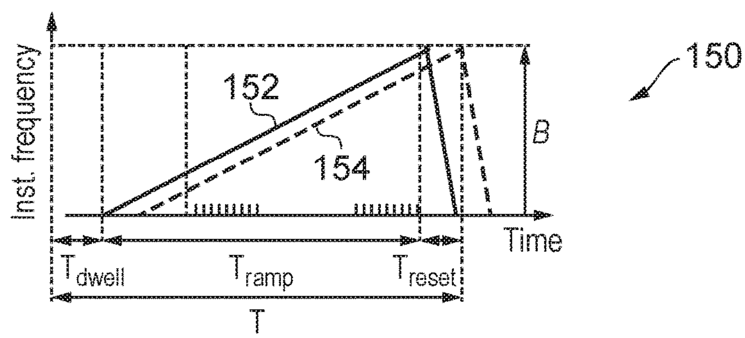
Figure 2B:
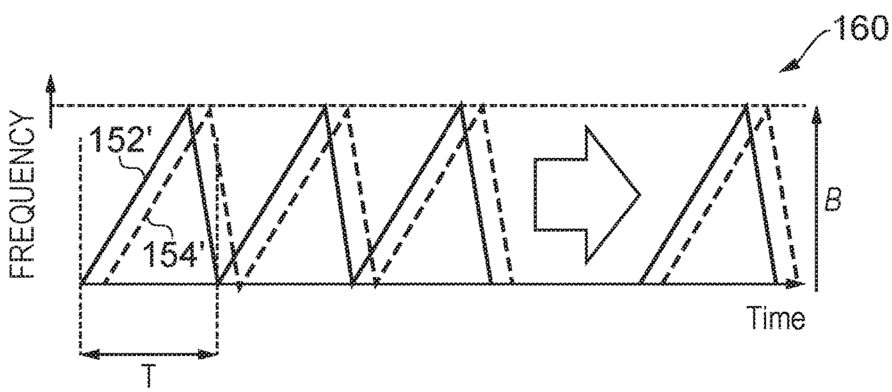
Figure 2C:
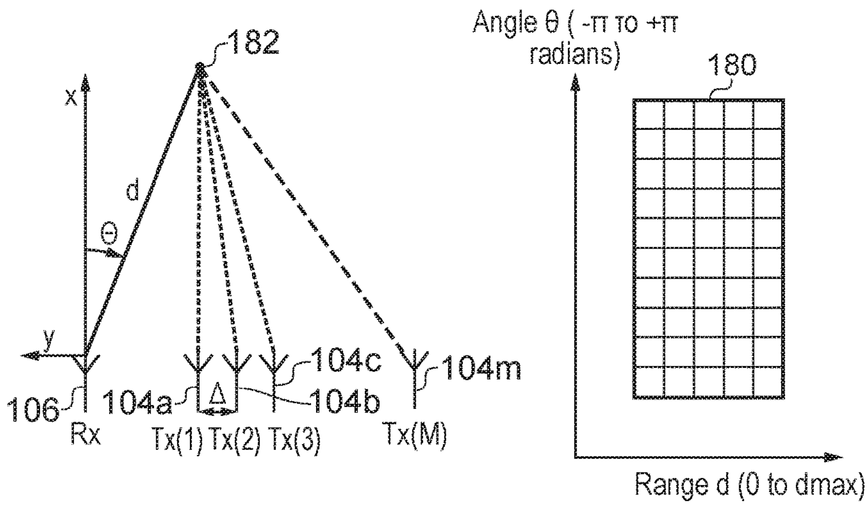

The operation of the radar system 100 is now described with reference to FIG. 1 and FIG. 2A-2D. In operation, the signal generator 114 generates a signal waveform to be at least partially transmitted by one or more of the RF transmitters 102*a* to 102*m*. In a radar system such as a FMCW radar, the signal generated is typically a linear frequency sweep referred to as an example of a chirp signal. The characteristics of the chirp signal are shown in FIG. 2A which shows a graph 150 of a chirp signal frequency variation on the y-axis with respect to time on the x-axis illustrated by line 152. The chirp signal may have a total time period T which may consist of an initial time period denoted $T_{dwell}$ corresponding to a period before the frequency ramp starts, a period $T_{ramp}$ corresponding to the linearly increasing frequency ramp of the chirp signal and a time period $T_{reset}$ during which the frequency is reset to the minimum frequency value. The frequency range of the ramp corresponds to a bandwidth B of the chirp signal. A time delayed version of the chirp signal illustrated by line 154 may be received by the RF receiver 108 when reflected from an object. The chirp signal may repeat with time period T as illustrated in FIG. 2B by graph 160 for transmitted chirp signal 152' and received chirp signal 154'. The general operation of a radar signal model is shown in FIG. 2C. Let an object be at distance d and at angle θ with respect to the radar system as shown in FIG. 2C the radar signal travels at speed of light c and when reflected from the object, it is received with a delay of 2d/c. Multiple transmit antennas 104*a*, 104*b*, 104*c*, 104*m* will introduce additional signal delays between the signals transmitted by the different antennas due to the different physical locations of the antennas. These additional delays will depend on the angle from which the signal is arriving θ and can be used to extract the information about the angular position of the object 182. As will be appreciated more than one object may be detected by the radar system 100.

The elements of matrix 180 may have elements corresponding to the different possible values of angle of arrival θ shown on the y axis 182 of the matrix 180 which may vary between −π to +π radians. The x axis 184 of the matrix corresponds to the range d which may be determined from the phase difference between the transmitted signal and received signal which may vary between 0 and a maximum value $d_{max}$ dependent on the power of the respective transmitters 104*a* . . . 104*m*.

Returning now to FIG. 1, the controller 112 couples the generated signal to different combinations of the transmitters 104*a* to 104*m* during the time period T of the chirp signal. The reflected signal is processed by the signal re-constructor 116 by comparing the measured incoming samples with a model of the expected response for varying values of range and angles of incidence represented by the two dimensional matrix 180 which may be stored in the memory 118. The inventor of the present disclosure has realized that the angular resolution may be determined in a single chirp time period T by transmitting the signal using combinations of antennas and then reconstructing the signal assuming that most of the elements of the two dimensional matrix 180 will be zero. This allows the location of an object with the same angular resolution to be determined much faster than would otherwise by the case since conventionally multiple chirp signals, each signal having period T are transmitted sequentially through each antenna in turn.

In case of FMCW radar the transmitted signal is typically a linear chirp that consists of a linear frequency ramp of bandwidth B occurring during period $T_{ramp}$ as explained previously with reference to FIG. 2B. It will be appreciated that the received signal from m-th antenna can be approximated by:

$$x_{mn}^{pointmodel}(a,d,\theta,t)=ae^{j\omega(d)t}e^{j\tau(\theta,m)} \tag{1}$$

Where a is the complex number with magnitude describing the strength of the received reflected signal and:

$$\omega(d)=2\pi\frac{2d}{c}\frac{B}{T_{ramp}} \tag{2}$$

is the distance dependent frequency of the demodulated signal. The delay τ(θ, m) describes the relative delay of the m-th antenna with respect to some reference antenna m=0. For two antennas at distance Δ from each other, the delay between the 2 signals can be approximated by $$2\pi\frac{\Delta}{\lambda}\sin\theta\_$$

assuming tat the object distance d is much larger than the distance between the antennas, usually the case in practice. For M uniformly spaced antennas $$\tau(\theta, m) = 2\pi\frac{\Delta m}{\lambda}\sin\theta$$

where λ is the wavelength of the radar signal.

$$x_{mn}^{pointmodel}(a, d, \theta) = ae^{j2\pi\frac{2d}{c/B}\frac{n}{N}}e^{j2\pi\frac{\sin\theta}{\lambda/(M\Delta)}\frac{m}{M}} \tag{3}$$

Where $x_{nm}$ denotes the n-th complex data sample during the transmission from the m-th antenna. In non-complex receivers the sample is equal to the real part of the equations. The radar signal does not reflect from a single point but from many points in space. We can define a set of distances $d_l$ and angles $\theta_k$ and approximate the received signal at antenna m as sum of reflections from all these possible points:

$$x_{mn}^{model}(A)=\Sigma_{l=0}^{N-1}\Sigma_{k=0}^{M-1}a_{kl}e^{j\omega_k m}e^{j\omega_l n} \tag{4}$$

where each $\omega_k$ corresponds to an angle $\theta_k$ and each $\omega_l$ corresponds to a distance $d_l$. The anti-alias filter is usually set according to the Nyquist sampling criteria to remove all frequencies above 1/(2T/N) Hertz. As a result the maximum distance that radar can estimate can be calculated from above as: N*c/(4B). The model depends on the unknown reflected signal strengths described by elements $a_{kl}$ of the matrix A.

Finding values of A that minimize the difference between the observed signals $x_{mn}$ and the model predicted signals $x_{mn}^{model}(A)$ is typical radar processing for detecting objects based on the radar signals. The sum of squared distances is minimized as measure of difference: E(A)

$$E(A)=\Sigma_{n=0}^{N-1}\Sigma_{m=0}^{M-1}(x_{mn}-x_{mn}^{model}(A))^2 \tag{5}$$

And $$\hat{A}=\text{argmin}(E(A))=\text{argmin}(\Sigma_{n=0}^{N-1}\Sigma_{m=0}^{M-1}(x_{mn}-x_{mn}^{model}(A))^2) \tag{6}$$

In case of a discrete set of distances and angles $$\omega_k = \frac{2\pi k}{M}, \omega_l = \frac{2\pi l}{N},$$

we have $$x_{mn}^{model}(A) = \sum_{l=0}^{N-1}\sum_{k=0}^{M-1} x_{mn}e^{j\frac{2\pi mk}{M}}e^{j\frac{2\pi nl}{N}} \tag{7}$$

There is an efficient closed form solution for this problem, also known as 2-Dimensional Discrete Fourier Transform which may be implemented as a Fast Fourier transform:

$$\hat{a}_{kl} = \frac{1}{NM}\sum_{n=0}^{N-1}\sum_{m=0}^{M-1} x_{mn}e^{-j\frac{2\pi mk}{M}}e^{-j\frac{2\pi nl}{N}} \tag{8}$$

For the radar system 100, the controller 112 may combine all antenna signals into a single signal during a single chirp period T. The model for the combined signal is $$x_n^{c,model}(A) = \sum_{m=0}^{M-1} c_{mn}\sum_{l=0}^{N-1}\sum_{k=0}^{M-1} a_{kl}e^{j\frac{2\pi mk}{M}}e^{j\frac{2\pi nl}{N}} \tag{9}$$

Where the $c_{mn}$ values are known gains used for each combination. The goal for minimization of the difference of the model to the data can be defined in the same way:

$$E^c(A)=\Sigma_{n=0}^{N-1}(x_n^c-x_n^{c,model}(A))^2 \tag{10}$$

And $$\hat{A}=\text{argmin}(E^c(A))=\text{argmin}(\Sigma_{n=0}^{N-1}(x_n^c-x_n^{c,model}(A))^2) \tag{11}$$

For the radar system 100 there are only N measurement samples $x_n^c$ whereas there are NM unknown $a_{kl}$ values in the matrix A. The problem is under-determined and as the consequence there will be many solutions with perfect model fit $x_n^c=x_n^{c,model}(A)$.

The inventor of the present application has realised that since most of the space is air which does not reflect the radar signals, most of the $a_{kl}$ values are expected to be zero. This can be taken into account and an alternative problem can be defined as determining from all values of A that satisfy $x_n^c=x_n^{c,model}(A)$, the value of A that has the minimal number of $a_{kl}$ different than zero. Finding a solution to this may allow all the relevant information to be extrated from the incomplete combined data.

This problem may be solved use a sparse approximation technique, for example by adding an initial term which captures the intuition that most $a_{kl}$ are expected to be zero as an additional regularization term $$R^c(A)=\Sigma_{l=0}^{N-1}\Sigma_{k=0}^{M-1}|a_{kl}| \tag{12}$$

The minimization corresponding to the best fit between the measured results and the model is determined from $$\hat{A}=\text{argmin}(E^c(A)+\lambda_R R^c(A)) \tag{13}$$

Whereby $E^c(A)$ and $R^c(A)$ are determined from equations (12) and (13), and $\lambda_R$ is typically a constant value that is selected from a characterization of the particular implementation of the radar system 100. For example the parameter $\lambda_R$ may be chosen by cross validation. Various values of $\lambda_R$ are tried for various data and the one minimizing the cross-validated error is used. A value of zero corresponds to the original non determined problem. During testing some small value, for example 0.0001 is used initially and then increased until the error on testing with cross validation data starts increasing.

The signal re-constructor 116 may implement equations 9, 10, 11, 12, 13 which may allow the determination of the location of an object within a single chirp period with a similar angular resolution to that achieved using multiple transmissions. It will be appreciated that the signal re-constructor 116 may be implemented for example by software executable on a digital signal processor or other microprocessor and consequently the matrix processing described in the above equations may be implemented using software. Alternatively or in addition, some of the functions in the signal re-constructor 116 may be implemented using dedicated logic hardware.

Figure 2D:
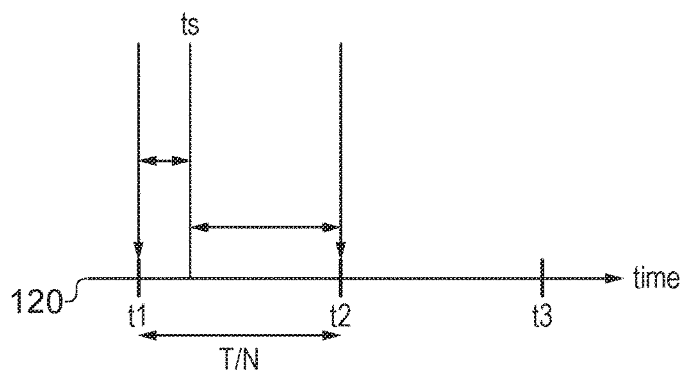

By determining the location of an object within a single chirp period, the radar system 100 may determine the movement of an object with greater accuracy than using a sequential transmission of a chirp through each of the transmitting antennas. FIG. 2D illustrates the timescale for transmitter combination changes with respect to the sample time of the reflected signal by the receiver. Timeline 120 shows the sample points at time t1, t2, and t3 spaced a time T/N apart where T is the chirp period time and N is the number of samples. For example T may be a value of 3 milliseconds and N may for example be a value of 1024 samples corresponding to a difference of t2–t1 of 3 microseconds. At time t1 a transmitted combination may be changed to a combination $c_{mn}$ by the controller 112. At time t2 the transmitted combination may be changed to a combination $c_{mn+1}$ by the controller 112. After the transmission combination is changed, the previous combination signal reflections will still arrive for some period depending on the object distances. After some distance the signals will become too weak to detect. For example over a range of 100 meters the delay becomes 2*100/c i.e. approximately 0.6 us. The corresponding sample $x_{mn}$ received by the receiver 108 should be taken at time $t_s$ in the period after the previous combination reflections have become too weak, which may for example be 0.6 microseconds. In some examples, the sample $x_{mn}$ may be taken at the same time as a new combination $c_{mn+1}$ is applied i.e. at time $t_2$, so $t_s=t_2$. This gives the maximum possible time for detection of valid signals transmitted from the previous transmitted combination $c_{mn}$. In some examples the controller may control both the time at which the transmitter combination changes and the receiver sampling time.

Although the analysis above applies to FMCW systems, it will be appreciated that in other examples, other continuous waves may be transmitted provided that the duration of the transmitted continuous wave is longer than the time of flight of the signal between the radar system and the object to be detected.

Figure 3:
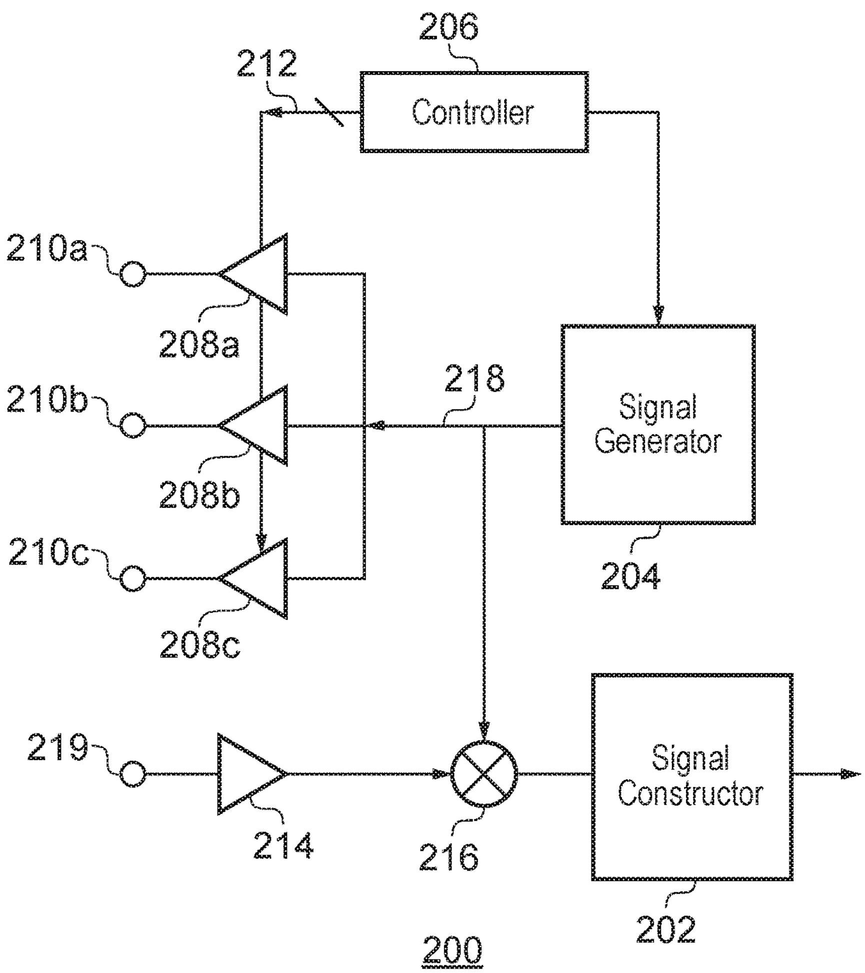

FIG. 3 shows an example of a radar system 200 having 3 transmitters and 1 receiver. A signal generator 204 which may for example generate a chirp signal may have a signal generator output 218 connected to an input of each of the variable gain RF transmitter amplifiers 208*a*, 208*b*, 208*c* which each have a respective output antenna terminal 210*a*, 210*b* and 210*c* for connecting to a respective antenna (not shown). The RF transmitter amplifiers 208*a*, 208*b*, 208*c* may be power amplifiers having a power output of in the range of 500 milliwatts to 3 watts dependent on the range to be covered. A transmitter controller 206 which may be implemented using logic hardware, or a combination of hardware and software may be connected to the gain control inputs of the respective amplifiers via a control bus 212. The output 218 of the signal generator may also be connected to a first input of a receiver mixer 216. A second input of the receiver mixer 216 may be coupled to an output of a receiver amplifier 214 which has an input 219 for connecting to a receive antenna (not shown). The output of the mixer 216 may be connected to a signal re-constructor 202. In operation the controller 206 may control the gains of the amplifiers 208*a*, 208*b* and 208*c* to output varying combinations of portions of the chirp signal generated by the signal generator 204. For example the gains may be switched between −1 or +1 corresponding to a polarity/phase switch. Alternatively or in addition the gain may be switched between 0 and 1 corresponding to switching the respective amplifier on or off. The output signals from the amplifiers 208*a*, 208*b*, 208*c* may be transmitted via respective antennas (not shown) connected to amplifier outputs 210*a*, 210*b*, and 210*c*. A reflected signal from an object may be received via a receive antenna and amplified by the amplifier 214 which may be a low noise amplifier. The output of the amplifier 214 is mixed with the originally generated signal from the signal generator and the resulting output is received by the signal constructor 202. The signal constructor 202 converts the received analog signal to a digital signal. The signal constructor 202 may reconstruct the signal by comparing the measured samples with an expected result from a model as previously explained using equations 9 to 13. The reconstructed signal output from the signal constructor may then show one or more peak values indicating the location of respective objects with respect to the radar system 200.

Figure 4A:
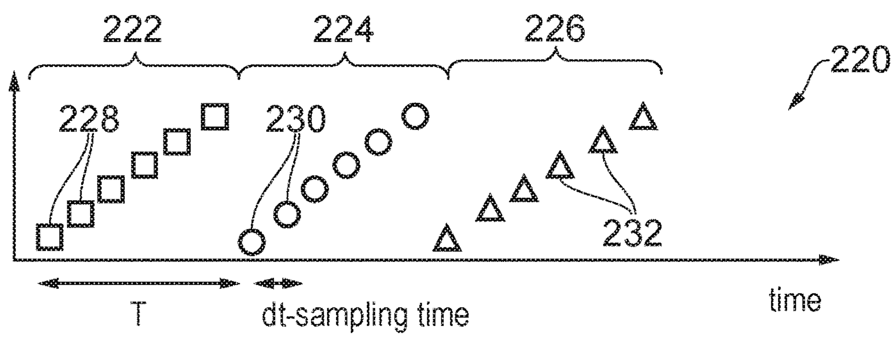
FIGS. 4A-4B illustrate a) a typical radar transmission for a MIMO radar system b) a radar transmission according to an embodiment.

An example typical transmission of a radar system 220 during the transmission of a chirp signal is shown in FIG. 4A. In this example, during a chirp period T, there are six sample periods each of duration dt. The square symbols 228 indicate an output from a first amplifier in a particular sample period dt, the circles 230 indicate an output from a second amplifier during a particular sample period dt and the triangles 232 indicate an output from a third amplifier during a particular sample period dt. In a conventional MIMO system the chirp signal is transmitted from each amplifier via a respective antenna sequentially during time periods 222, 224 and 226 respectively, consequently in this example the location of the object is determined after a duration of 3T.

Figure 4B:

An example combination of antenna outputs used 240 during the transmission of a chirp signal by the radar system 200 is shown in FIG. 4B. In this example, six sample periods each of duration dt have varying combinations 242 of the output of the three amplifiers. The square symbols indicate an output from the first amplifier 208*a* in a particular sample period dt, the circles indicate an output from the second amplifier 208*b* during a particular sample period dt and the triangle indicate an output from the third amplifier 208*c* during a particular sample period dt. The radar system 200 may reconstruct a reflected signal with an equivalent angular resolution to the case illustrated in FIG. 4A in a single chirp time period T.

In addition to the above combination sequence, it will be appreciated that other combinations of antennas are also possible. In the general case, the gain of amplifier for each antenna (m) during each sample or measurement period (n) may be denoted as $c_{mn}$ The amplifier gain may be for example a gain switching between −1 and 1, or gain switching between 0 and 1. Now considering one sequence per antenna $c_{mn}$ (with n=1 . . . N) and denoting as vector $c_m$, then the M sequences $c_m$ should have properties typical for good sequences used in spread spectrum communication. Assuming all antennas are equally important then the sequences may have one or more of the following properties:

- The frequency spectrum of each sequence $c_m$ may be wide, ideally flat. For example $c_m$ may be sampled at T/N sample time intervals corresponding to time dt, and so the frequency spectrum of the signal may have energy in many or all parts of a frequency range between zero and the Nyquist frequency 1/(2T/N). If all sequences are chosen to include part of the spectrum then reconstruction of the full spectrum will not be possible. If one of the sequences is not wide spectrum then the information from that antenna will not be used optimally.
- The total power of the sequences should be similar, that is to say within 5% to equally use the information from all the antennas, that is to say the output should be balanced.

The cross correlation between two sequences for two different antennas should be minimal. For example, the sequences may be orthogonal with cross correlation value of zero.

Some examples of appropriate sequence generators are so-called "Gold codes" or Pseudo noise generated using shift registers. In other examples other spread spectrum code sequences may be used.

Figure 5A:
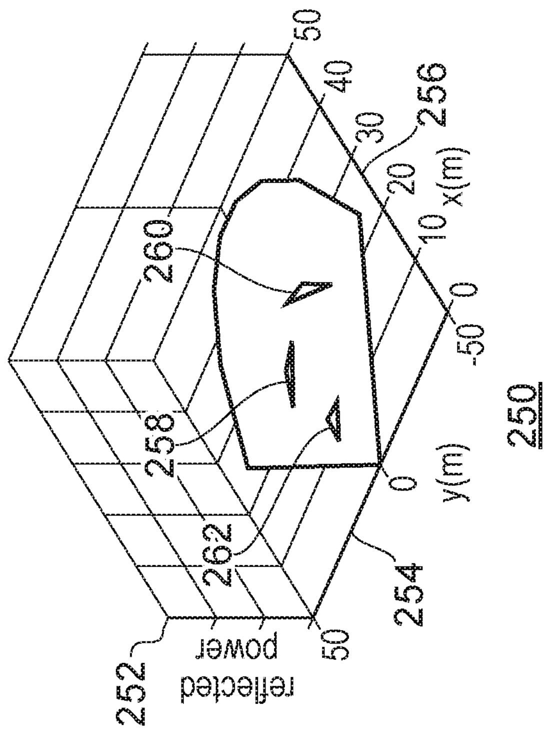
FIGS. 5A-5B shows a) object detection results for a MIMO radar system according to an embodiment and b) object detection results for a typical MIMO radar system.
Figure 5B:
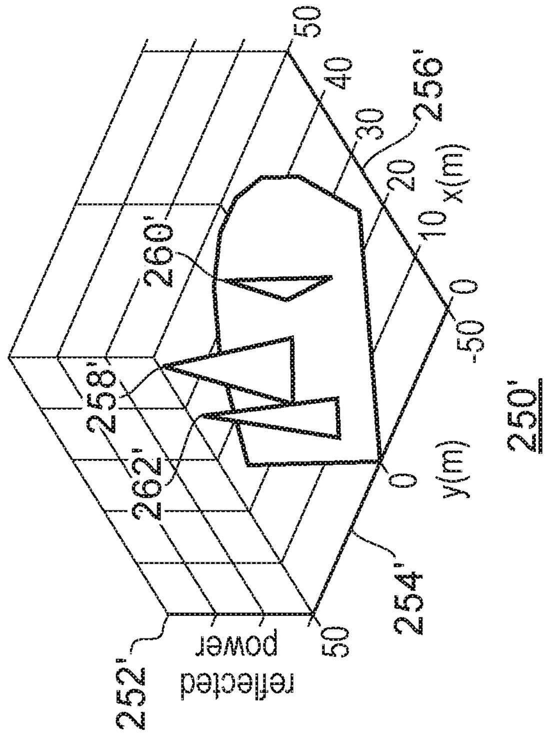

FIG. 5A illustrates a matrix (A) 250 transformed to x, y two-dimensional positions with respect to an example FMCW MIMO radar system at the origin x=0, y=0. The x-axis 256 varies in meters between 0 and 50 m. The y-axis 254 varies between −50 meters and +50 meters. The radar system in this example is an example of radar system 100 with M=8 transmitters, each transmitter coupled to a respective antenna and 1 receiver connected to a respective antenna. The reflected signals angle of arrival may vary in the range −pi/3 to pi/3 radians for each of the transmitters. The z-axis 252 shows the reflected power detected by the receiver 108. N=256 samples are taken during each chirp period T. The combinations of the 8 transmitters using during the chirp are changed after a time T/256.

The result of the processing by the signal re-constructor shows objects with peaks at 258, 260, and 262.

FIG. 58 indicates the response 250' of a MIMO system with conventional sequential transmission of a chirp signal from 8 antennas. The x-axis 256 varies between 0 and 50 meters. The y-axis 254 varies between −50 meters and +50 meters. The radar system in this example has M=8 transmitters coupled to a respective antenna and 1 receiver connected to a respective antenna. The reflected signals angle of arrival may vary in the range −pi/3 to pi/3 radians for each of the transmitters. The z-axis 252 shows the reflected power detected by the receiver 108. N=256 samples are taken during each chirp period T. A single transmitter is used for each chirp period T and so the response shown in matrix 250' represents the results after a time 8T. The result of the processing using a conventional 2D Fourier transform shows objects with peaks at 258' and 260', and 262'.

It can be seen from a comparison of the peaks of graph 250 and 250' that the radar system 100 which transmits combinations of samples during a single chirp detects the object locations correctly and takes less time than the radar system with the response shown in 250'. The radar system 100 may detect objects with the same angular resolution as a typical MIMO radar. As only a single chirp for detection is used the peaks are lower than 250' since less energy is used in transmission but the detection speed is faster. If the transmitted energy is increased the peaks will become higher.

Figure 6:
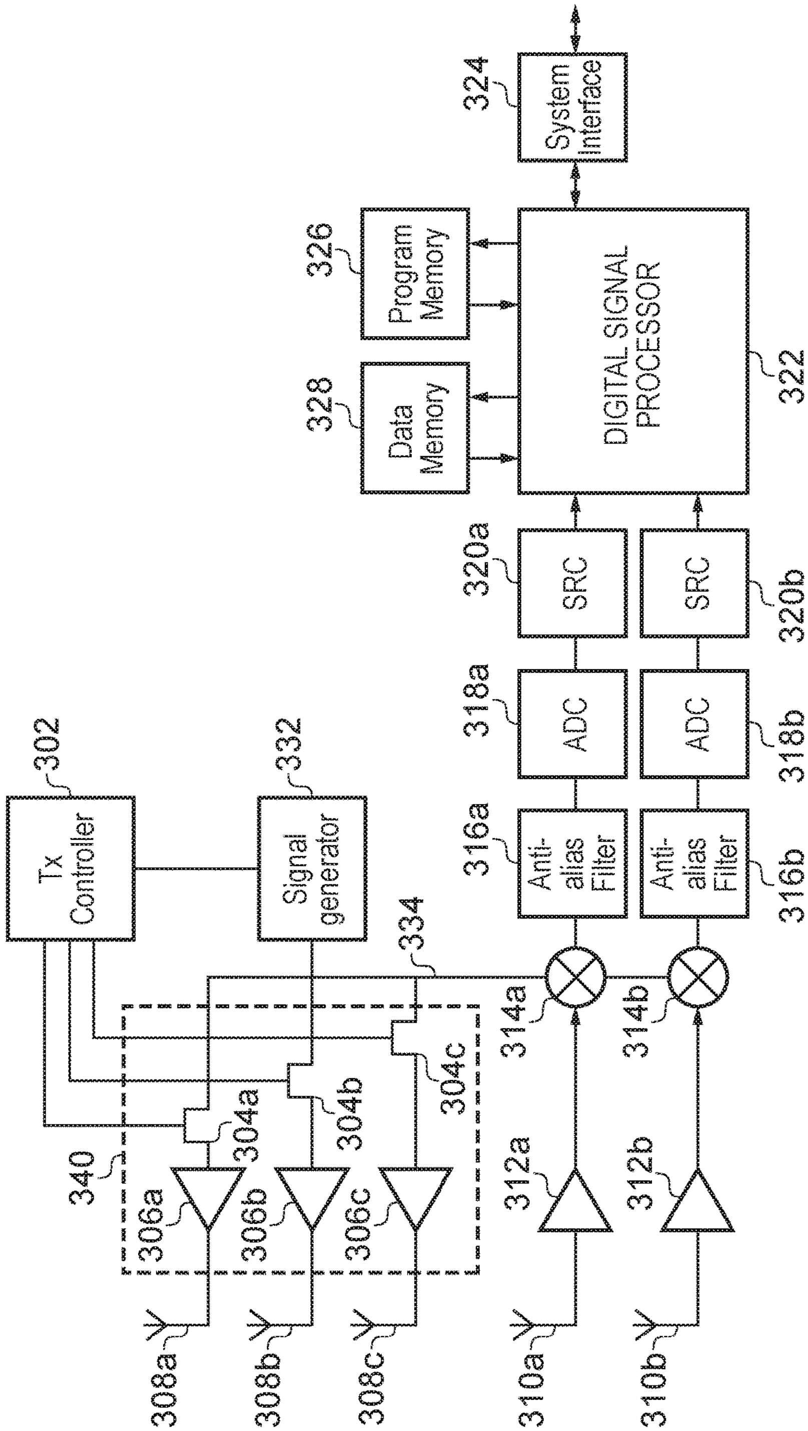
FIG. 6 illustrates a radar system according to an embodiment.

FIG. 6 shows a radar system 300 with a transmitter module 340 including three transmitters each transmitter including a series arrangement of a transistor 304*a*, 304*b*, 304*c* and a respective amplifier 306*a*, 306*b*, 306*c*. The outputs of each of the RF amplifiers 306*a*, 306*b* and 306*b* are connected to a respective antenna 308*a*, 308*b*, and 308*c*. A transmitter controller 302 may have three control outputs, each control output connected to a respective gate of the transistors 304*a*, 304*b*, and 304*c*. The transmitter controller 302 may be connected to a signal generator 332. An output 334 of the signal generator 332 may be connected to each of the transistors 304 *a*, 3048, and 304C. The output 334 of the signal generator 332 may be connected to each of mixers 314A, 314B in the respective receiver chains. The radar system 300 includes two receiver chains. Each receiver chain consists of a series arrangement of an antenna 310*a*, 310*b*; an amplifier 312*a*, 312*b*; the mixers 314*a*, 314*b*; an anti-alias filter 316*a*, 316*b*; an analog to digital converter 318*a*, 318*b*; and a sample rate converter 320*a*, 320 *b*. The output from each of the sample rate converters 320*a*, 320*b* may be connected to a digital signal processor 322. The digital signal processor 322 may be connected to a data memory 328, and a program memory 326. The digital signal processor 322 may be connected to a system interface 324. The system interface may have an interface bus to communicate for example with a host processor (not shown). The program memory 326 may store a program to execute the signal reconstruction in accordance with equations 9 to 13. The digital signal processor 322, in combination with signal reconstruction software stored in the program memory 326 may implement the signal re-constructor. The data memory 328 may be partially used to store the range value matrix 180.

It will be appreciated that the transmitter controller 302 may be implemented using digital logic or a combination of digital logic and software running on a microprocessor such as a digital signal processor. The signal generator 332 may be implemented as a combination of digital and analogue circuitry to generator the analog chirp signal. The signal generator 332 may also be at least partially implemented in software executable on a microprocessor. The chirp signal may have a frequency range between 1 and 100 GHz. The frequency sweep of the chirp signal may include all frequencies between 1 and 100 GHz or a portion of the range. For car radar applications the frequencies between 77 and 81 GHz may typically be used, however, it will be appreciated that other example radar systems may use other frequency ranges.

In operation of the radar system 300, the transmit controller 302 may enable the signal generator 332 to generate a chirp signal on the output 334. The transmit controller 302 may control the combinations of the transmit antenna 308*a*, 308*b*, 308*c* which are used in a particular sample period during the single chirp period T. The reflected chirp signal may be received by each of the two respective receive chains via the antenna 310*a*, and 310*b*. Following mixing by the respective mixer 314*a* and 314*b*, the demodulated waveform may have a frequency of approximately 40 MHz. This relatively low frequency signal contains the depth or distance information and the phase difference between the signal transmitted from each of the respective transmitter antennas 308*a*, 308*b*, 308*c* indicates the angle of arrival of the reflected signal. In addition the phase difference between the signal received by the first and second receiver chains may also indicate the angle of arrival. The signal re-constructer 330 may process the signal from the two receiver chains and determine a location of an object within a single chirp period according to equations 9 to 13 as previously described. The signal re-constructor 330 may combine processing according to equations 9 to 13 with the standard virtual antenna processing in accordance with equations 1 to 8 to effectively double the angular resolution within the time period of a single chirp. Some or all of the elements of the radar system 300 may be incorporated in a CMOS integrated circuit.

For an additional receive antenna at distance $\Delta_r$ the additional delay due to the angle can be approximated $$as\tau(\theta, m, r) = 2\pi\frac{\Delta m + \Delta_r}{\lambda}\sin\theta.$$

For R receive antennas, models may generated similar to equations 2 and 3. The model fitting is then done for all received signals and becomes:

$$E^c(A)=\Sigma_{r=1}^{R}\Sigma_{n=0}^{N-1}(x_{r,n}^{c}-x_{r,n}^{c,model}(A))^2 \quad (14)$$

The rest of the signal reconstruction is the same as previously described.

Figure 7:
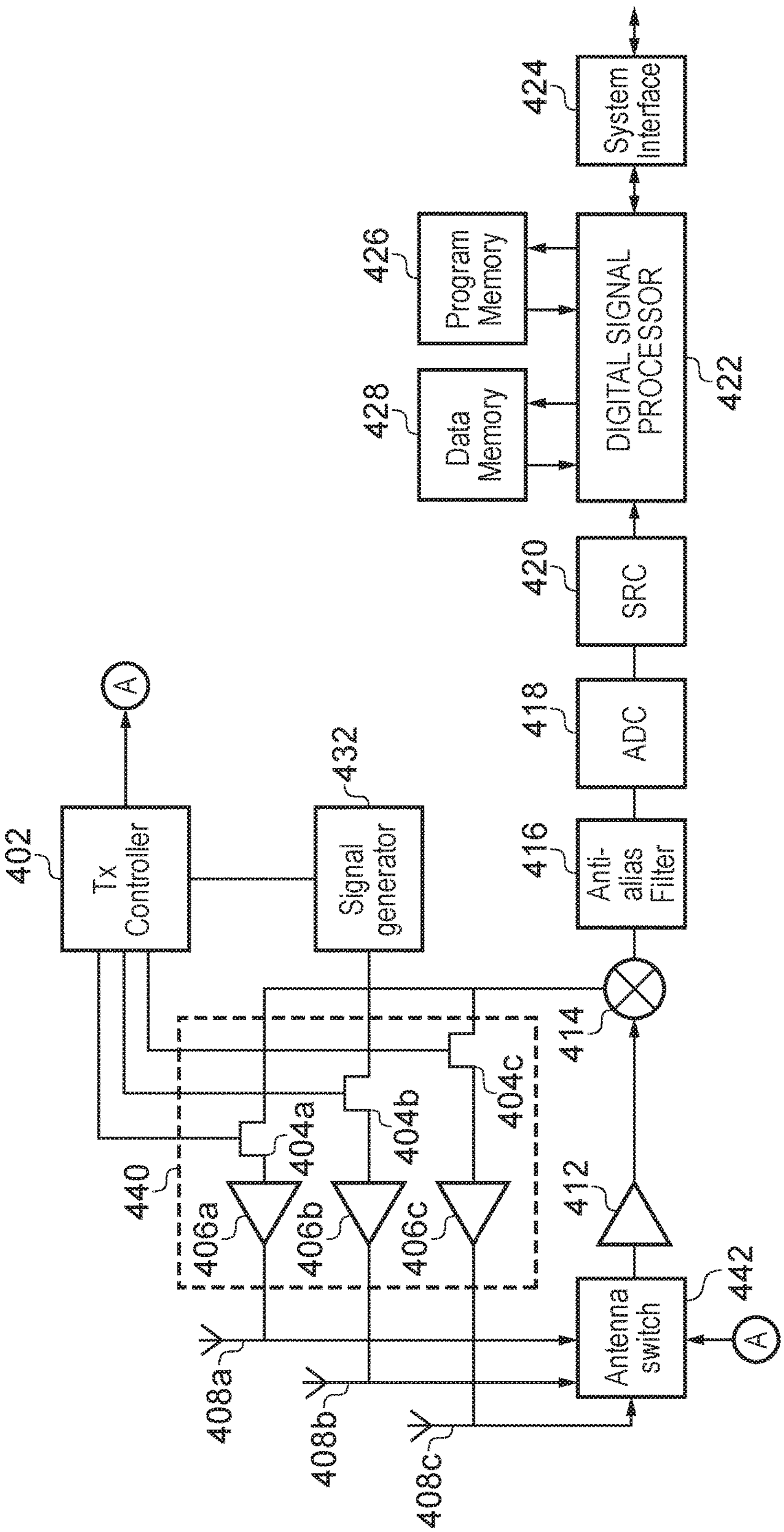
FIG. 7 illustrates a radar system according to an embodiment.

FIG. 7 shows a radar system 400 with a transmitter module 440 including three transmitters each transmitter including a series arrangement of a transistor 404*a*, 404*b*, 404*c* and a respective amplifier 406*a*, 406*b*, 406*c*. The outputs of each of the amplifiers 406*a*, 406*b* and 406*b* are connected to a respective antenna 408*a*, 408*b*, 408*c*. The antennas 408*a*, 408*b* and 408*c* are connected to an antenna switch module 442. The antenna switch module 442 is connected to the controller via a control output denoted with the letter A on FIG. 7. The transmission controller 402 may have three further control outputs, each control output connected to a respective gate of the transistor 404*a*, 404*b*, and 404*c*. The transmission controller 402 may be connected to the signal generator 432. An output 434 of the signal generator 432 may be connected to each of the transistors 404*a*, 404*b*, and 404*c*. The output 434 of the signal generator 432 may be connected to the mixers 414 in the receiver chain. The radar system 400 includes one receiver chain including a series arrangement of an amplifier 412; a mixer 414; an anti-alias filter 416; an analog to digital converter 418; and a sample rate converter 420. An output from the antenna switch module 424 may be connected to an input of the amplifier 412. The output from the sample rate converter 420 may be connected to a digital signal processor 422. The digital signal processor 422 may be connected to a data memory 428, and a program memory 426. The digital signal processor 422 may be connected to a system interface 424. The system interface 424 may have an interface bus to communicate for example with a host processor (not shown). The program memory may store a program to execute the signal reconstruction in accordance with equations 9 to 13. The digital signal processor 422, in combination with signal reconstruction software stored in the program memory 426 may implement the signal re-constructor. The data memory 428 may be partially used to store the range value matrix 180.

It will be appreciated that the transmit controller 402 may be implemented using digital logic or a combination of digital logic and software running on a microprocessor such as a digital signal processor. The signal generator 432 may be implemented as a combination of digital and analogue circuitry to generator the analog chirp signal. The signal generator 332 may also be at least partially implemented in software executable on a microprocessor. The chirp signal may have a frequency range between 1 and 100 GHz. The frequency sweep of the chirp signal may include all frequencies between 1 and 79 GHz or a portion of the range. For car radar applications the frequencies between 77 and 81 GHz may typically be used, however, it will be appreciated that other example radar systems may use other frequency ranges.

In operation of the radar system 400, the transmit controller 402 may enable the signal generator 432 to generate a chirp signal on the output 434. The transmit controller 402 may control the combinations of the transmit antenna 408*a*, 408*b*, 408*c* which are used in a particular sample period during the single chirp period T. The transmit controller may control the antenna switch module 442 to use combinations of the transmit antenna 408*a*, 408*b*, and 408*c* for receiving when not used for transmitting. The reflected chirp signal may be received by each of the two respective receive chains via one or more of the antennas 408*a*, 408*b* and 408*c*. Following mixing by the respective mixer 414*a* and 414*b*, the demodulated waveform may have a relatively low frequency, for example a frequency of approximately 40 MHz. This relatively low frequency signal typically contains the depth or distance information and the phase difference between the signal transmitted from each of the respective transmitter antennas 408*a*, 408*b*, 408*c* indicates the angle of arrival of the reflected signal. The signal re-constructer 430 may process the signal from the receiver chain and determine a location of an object within a single chirp period according to equations 9 to 13 as previously described.

Figure 8:
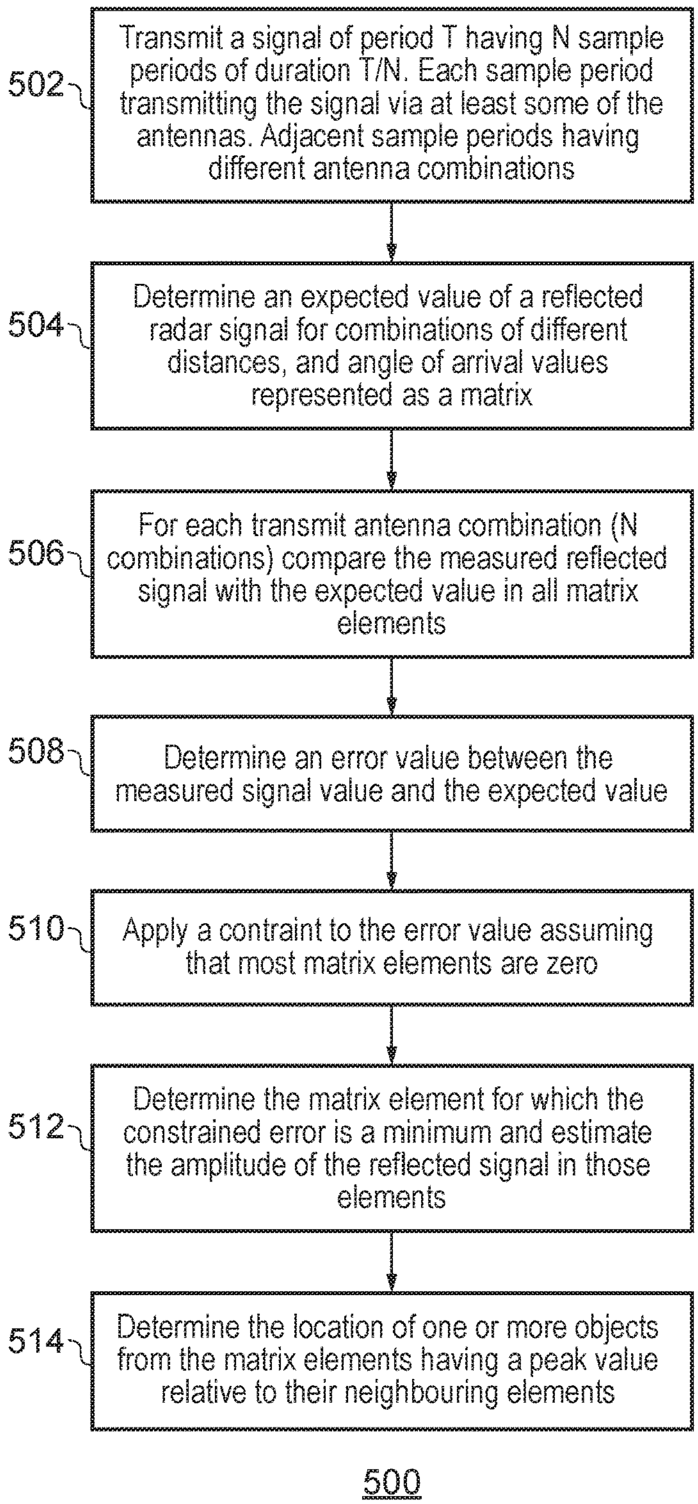
FIG. 8 shows a method of detecting an object in a radar system for a motor vehicle according to an embodiment.

FIG. 8 shows a method of determining the location of an object 500 in a radar system with multiple transmitters and at least one receiver. In step 502 a radar signal for example a chirp signal with a time period T may be transmitted. The time period T may consist of T/N sub-period or sample periods and in each of these sample periods a varying combination of antenna may be used to transmit the signal. Adjacent sample periods may use different combinations of the antennas.

In step 504 an expected value for each value of distance and angle of arrival may be determined from a model of the reflected signal received by a receiver. The expected value which may be represented as a range value matrix. As will be appreciated, the values of each matrix element may be stored in a memory to avoid recalculating the expected values for each element. In step 506, for each of the N sample periods having duration T/N, the reflected signal may be compared with the expected values in the matrix elements. In step 508 an error between the measured signal value and the expected value is determined. In step 510 a constraint may be applied to the error term which assumes that most matrix element values are zero. This may be for example the regularization function described in equations 9 to 13.

In step 512 the matrix element for which the constrained error is a minimum may be determined and the amplitude of the reflected signal for those matrix elements may be determined.

In step 514, the location of one or more objects may be determined from one or more peak values determined from a comparison of the matrix element values with respect to their neighbouring matrix elements. This may be considered a localized peak value which indicates the location of an object. As will be appreciated the radar system may detect multiple reflection from multiple objects.

The method 500 allows the location of an object to be determined in a radar system with M transmitting antenna using a single chirp signal period T having N sample periods of time T/N with N measurements compared to MN measurements in a typical system. The MIMO system implementing the method 500 may reduce the object detection time and so may detect faster moving objects.

A radar system for a motor vehicle is describe including a plurality (M) of transmitters for transmitting a radar signal, a receiver for receiving the transmitted radar signal reflected by an object, a signal re-constructor coupled to the receiver. Each transmitter is configured to transmit at least part of a frequency modulated continuous wave signal during a time period T having N sample time periods of duration T/N, and in each of the N sample time periods combinations of at least some of the transmitters transmit. The signal re-constructor is configured to determine the coordinates of an object with respect to the radar system from N measurements of the received frequency modulated continuous wave signal, each of the N measurements being made for a time period of T/N. The radar system may reduce the detection time for objects while maintaining the angular resolution.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable sub combination.

The applicant hereby gives notice that new claims may be formulated to such features and/or combinations of such features during the prosecution of the present application or of any further application derived therefrom.

For the sake of completeness it is also stated that the term “comprising” does not exclude other elements or steps, the term “a” or “an” does not exclude a plurality, a single processor or other unit may fulfil the functions of several means recited in the claims and reference signs in the claims shall not be construed as limiting the scope of the claims.

The invention claimed is:

1. A radar system for a motor vehicle comprising:
- a plurality of transmitters for transmitting a radar signal comprising a continuous wave signal,
- a receiver for receiving the transmitted radar signal reflected by an object, and
- a signal re-constructor coupled to the receiver,
- wherein each transmitter is configured to transmit at least part of the continuous wave signal during a time period, wherein the time period is divided into a number of sample time periods and at least one of the plurality of transmitters is configured to transmit the radar signal during each of the number of sample time periods,
- wherein the signal re-constructor is configured to determine the coordinates of the object with respect to the radar system from performing measurements of the transmitted signal that is received after being reflected from the object wherein the measurements are performed a number of times equal to the number of sample time periods.

2. The radar system of claim 1, further comprising a signal generator coupled to the plurality of transmitters, the signal generator being configured to generate a continuous wave signal comprising a frequency modulated continuous wave chirp signal which repeats after the time period.

3. The radar system of claim 1, further comprising a transmit controller coupled to each of the transmitters wherein the transmit controller is operable to route the continuous wave signal to at least one of the transmitters during each of the sample time periods.

4. The radar system of claim 3, wherein the transmit controller is configured to vary the combinations of transmitters used to transmit during the time period in at least one of a pseudo-random sequence, and a Gold code sequence.

5. The radar system of claim 1, wherein the received radar signal is processed by the signal re-constructor as a sparse signal.

6. The radar system of claim 5, wherein the signal re-constructor is configured to generate an estimate of the expected signal value of the received signal for each of a plurality of distances between an object and the radar system and an angle of arrival of the received signal and to compare the measured signal value with the expected signal value for each combination of the distances and angles of arrival.

7. The radar system of claim 6, wherein the signal re-constructor is further configured to determine the most likely location of an object by determining a minimum difference between the expected value and the received signal value for each combination of the distance and angle of arrival.

8. The radar system of claim 5, further comprising an antenna switch module coupled to the controller wherein the controller is operable to couple an antenna to the receiver when not in use by a transmitter.

9. An automatic driver assistance system comprising the radar system of claim 1.

10. An integrated circuit comprising the radar system of claim 1.

11. A method of determining the coordinates of an object in a radar system comprising a plurality of transmitters and a receiver, the method comprising transmitting at least part of a frequency modulated continuous wave signal during a time period by varying the combinations of the transmitters used to transmit the signal, wherein the time period is divided into a number of sample time periods and at least one of the plurality of transmitters is configured to transmit at least part of the frequency modulated continuous wave signal during each of the number of sample time periods, receiving the transmitted frequency modulated continuous wave signal reflected from an object, and determining a distance and angle of the object with respect to the radar system from measuring the reflected frequency modulated continuous wave signal, wherein the measuring is performed a number of times equal to the number of sample time periods.

12. The method of claim 11, wherein the continuous wave signal comprises a frequency modulated continuous wave chirp signal of a duration equal to or less than the time period.

13. The method of claim 11, wherein determining the distance and angle of the object further comprises summing values of the received signal strength for each element of a matrix, each matrix element representing a signal strength value for a particular angle of arrival value and range value.

14. The method of claim 13, wherein determining the distance and angle of the object comprises assuming that the majority of elements in the matrix are zero.

15. The method of claim 11, wherein determining the distance and angle of an object further comprises:
- generating an estimate of the expected signal value of the received signal reflected from an object over a combination of a range of distances and angles of arrival
- comparing the measured signal value with the expected signal value for each combination of the distance and angles of arrival.

* * * * *